(12) United States Patent
Degorce-Dumas et al.

(10) Patent No.: US 12,224,645 B2
(45) Date of Patent: Feb. 11, 2025

(54) SHAPED DECOUPLING MEANS OF TWO COAXIAL RINGS IN A MOTOR, AND SUPPORT FOR A MOTOR AND HEATING, VENTILATION FOR A MOTOR VEHICLE

(71) Applicant: Valeo Systemes Thermiques, Le Mesnil Saint-Denis (FR)

(72) Inventors: Clara Degorce-Dumas, Le Mesnil Saint Denis (FR); Clémence Kwaczewski, Le Mesnil Saint-Denis (FR); Stéphane De Souza, Le Mesnil Saint-Denis (FR); Vincent Guilbot, Le Mesnil Saint-Denis (FR); Saad Bennouna, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 467 days.

(21) Appl. No.: 17/623,357

(22) PCT Filed: Jun. 16, 2020

(86) PCT No.: PCT/FR2020/051031
§ 371 (c)(1),
(2) Date: Dec. 28, 2021

(87) PCT Pub. No.: WO2020/260794
PCT Pub. Date: Dec. 30, 2020

(65) Prior Publication Data
US 2022/0368192 A1     Nov. 17, 2022

(30) Foreign Application Priority Data

Jun. 28, 2019   (FR) ...................................... 1907099

(51) Int. Cl.
*H02K 5/24*     (2006.01)
*F04D 25/06*    (2006.01)
(Continued)

(52) U.S. Cl.
CPC ............... *H02K 5/24* (2013.01); *F04D 25/06* (2013.01); *F04D 25/08* (2013.01); *F04D 29/663* (2013.01)

(58) Field of Classification Search
CPC .. H02K 7/14; H02K 5/24; H02K 5/26; H02K 2213/03; F04D 25/06; F04D 25/08; F04D 29/663; F04D 29/668
(Continued)

(56) References Cited

U.S. PATENT DOCUMENTS

2004/0012289 A1* 1/2004 Gross ..................... F04D 29/626
                                                              310/91
2007/0292261 A1* 12/2007 Tang ..................... F04D 29/663
                                                              415/119
(Continued)

OTHER PUBLICATIONS

Elastomer_Hardness_Selection_Rahco_Rubber.*

*Primary Examiner* — Christopher M Koehler
*Assistant Examiner* — Maged M Almawri
(74) *Attorney, Agent, or Firm* — Osha Bergman Watanabe & Burton LLP

(57) ABSTRACT

The motor support (16) comprises an inner ring (20) able to receive an element of the motor and an outer ring (22) able to be fastened to a housing, and a means (24) of decoupling between the two coaxial rings (20; 22) comprising a plurality of pads (46) of elastomer material that are interposed between the inner ring (20) and the outer ring (22). Each pad (46) is substantially "H"-shaped in form. The two arms (46int, 46ext; 46₁, 46₂) of the «H» are separated by a distance B. Each arm (46int, 46ext; 46₁, 46₂) has a width D measured in the radial direction. The web (46a) of the "H" has a width A measured in the orthoradial direction. The ratio A/B B is greater than or equal to 1.4, and the ratio A/D is greater than or equal to 2.

9 Claims, 9 Drawing Sheets

(51) Int. Cl.
*F04D 25/08* (2006.01)
*F04D 29/66* (2006.01)

(58) Field of Classification Search
USPC .......................................................... 310/51
See application file for complete search history.

(56) References Cited

U.S. PATENT DOCUMENTS

| 2009/0189052 | A1* | 7/2009 | Naji | H02K 5/24 |
| | | | | 248/672 |
| 2013/0221786 | A1* | 8/2013 | Truillet | H02K 5/24 |
| | | | | 310/91 |
| 2016/0329793 | A1* | 11/2016 | Li | F04D 25/06 |

* cited by examiner

SHAPED DECOUPLING MEANS OF TWO COAXIAL RINGS IN A MOTOR, AND SUPPORT FOR A MOTOR AND HEATING, VENTILATION FOR A MOTOR VEHICLE

TECHNICAL FIELD

The present invention relates to the field of heating, ventilation and/or air-conditioning devices for motor vehicles. The invention relates more particularly to an electric-motor support for such a device.

PRIOR ART

Motor vehicles are currently equipped with a heating, ventilation and/or air conditioning device able to generate an air flow. Such a device is also able to manage the temperature and distribution within the vehicle interior of the air flow created. Such a heating, ventilation and/or air-conditioning device comprises, inter alia, a fan comprising a fan impeller rotationally driven by an electric motor. The electric motor is notably an electronically switched electric motor controlled by a power supply module.

An electronically switched electric motor, or brushless direct current motor, comprises a rotor and stator assembly, each of these components bearing electromagnetic elements whose interaction generates the movement of the rotor in relation to the stator and, ultimately, the movement of the fan impeller.

The electric motor is assembled in the heating, ventilation and/or vibration device via a motor support which comprises an inner ring configured to accept the stator of the electric motor, and an outer ring able to be fixed, directly or indirectly, to a structural element of the vehicle.

A decoupling element is interposed between the inner ring and the outer ring. This decoupling element is intended to limit, and preferably to prevent, the transmission of vibrations and/or stresses generated by the rotation of the electric motor, from the inner ring to the outer ring. This then limits the transmission, to the heating, ventilation and/or air conditioning device, of vibrations that could be felt by the occupants of the vehicle.

The decoupling element allows a significant amount of relative movement of the inner ring with respect to the outer ring, particularly in the case of vibration. In that case, the repeated movements may, in the long term, lead to breakage of the decoupling element. One difficulty is thus that of obtaining a decoupling element that exhibits good mechanical endurance and also allows weak transmission of the vibrations.

The object of the present invention is to propose a motor support, notably for a motor vehicle heating, ventilation and/or air conditioning device, that is simple to produce and that does not exhibit at least some of the disadvantages of the supports of the prior art.

SUMMARY

To this end, one subject of the invention is a motor support, notably for a motor-fan unit of a vehicle ventilation installation, comprising:
two coaxial rings, these being an inner ring able to accept one or more elements of the motor and an outer ring able to be fixed to a housing that forms a structural element,
a decoupling means for decoupling the two coaxial rings and comprising a plurality of blocks which are made of an elastomeric material and are interposed between the inner ring and the outer ring, each block being substantially H-shaped, the two arms of the H being separated by a distance B, each arm having a width D measured in the radial direction, the web of the H having a width A, measured in the orthoradial direction, wherein the ratio NB is greater than or equal to 1.4 and the ratio A/D is greater than or equal to 2.

Thus, surprisingly, the blocks thus defined are able to reinforce the decoupling element to prevent early deterioration thereof, while at the same time maintaining a relatively low natural frequency making it possible to limit the noise in the interior of the vehicle in which the motor support is incorporated.

As a preference, the motor support comprises one or more of the following features, considered alone or in combination:
each block has a thickness C measured in the direction of the common axis of the two rings, the thickness C being greater than or equal to 10 mm, preferably greater than or equal to 14 mm, and/or less than 20 mm, preferably less than or equal to 16 mm, and/or
the distance B is greater than or equal to 3 mm and/or less than or equal to 6 mm
the width A is greater than or equal to 4 mm and/or less than or equal to 20 mm;
the width D of the arms of the H is greater than or equal to 2 mm and/or less than or equal to 5 mm;
the web of the H has a blind hole, preferably substantially at the center of the web and extending in the direction of the common axis of the two rings;
each block is flush with at least one of the two rings in the direction of the common axis of the two rings;
the decoupling means comprises an elastomer ring extending between the two rings, the elastomer ring preferably being formed as one with the blocks;
the elastomer ring defines an annulus positioned radially between, on the one hand, one of either the inner ring or the outer ring and, on the other hand, the blocks;
the elastomer material has a hardness of between 25 and 60 Shore, notably substantially equal to 40 Shore;
the motor support comprises at least one tilt-limiting element limiting the tilting of the inner ring with respect to the outer ring, the tilt-limiting element comprising a finger projecting from a first of the two rings and housed in a receptacle formed in the second of the two rings, two axial end-stops being formed in the receptacle to limit the movement of the finger in the receptacle with respect to the direction of the common axis of the two rings;
the motor support comprises two blocks arranged angularly, symmetrically on each side of each finger;
a means for limiting the relative movement of one of the two rings with respect to the other, in a plane normal to the common axis of the two rings, comprising at least one radial end-stop fixed to one of the two rings, with a radial clearance between the end-stop and the other of the two rings;
the at least one radial end-stop extends between the inner ring and the outer ring, the at least one radial end-stop preferably having an interior curvature that complements the curvature of the inner ring and/or an exterior curvature that complements the curvature of the outer ring;
the inner ring and/or the outer ring is covered with an elastomeric material, at least facing the at least one radial end-stop;

the motor support comprises at least two radial end-stops that are opposite one another with respect to the center of the rings, preferably at least three radial end-stops evenly angularly distributed about the common axis of the two rings;

the radial clearance is substantially 1 mm;

the motor support further comprises a means for limiting, preferably preventing, relative rotation of the rings about the common axis of the two rings—at least one of the axial end-stops projects into the receptacle;

elastomeric material is arranged between the finger and each of the two axial end-stops and in contact with the finger and one of the two axial end-stops, the elastomeric material preferably being compressed between the finger and each of the two axial end-stops, the elastomeric material more preferably still having a compression ratio greater than or equal to 5% and/or less than or equal to 25%, more preferably still, substantially equal to 15%;

the motor support comprises the one same thickness of elastomer between the finger and each of the two end-stops;

the at least one axial end-stop extends in a direction substantially perpendicular to the direction of elongation of the finger;

the motor support comprises two axial end-stops projecting into the receptacle and positioned one on each side of the finger, the two projecting axial end-stops facing one another;

the elastomeric material is overmolded onto two opposite faces of the finger;

the elastomeric material on the faces of the finger has a hardness of between 20 and 45 Shore, notably substantially equal to 25 Shore;

the elastomeric material in contact with the finger and each of the two end-stops is formed as one with the elastomer ring;

the finger has an H-shaped cross section; and the two opposite faces of the finger that face the axial end-stops are planar.

Another aspect of the invention describes a fan, particularly for a ventilation installation for a vehicle, comprising an electric motor, particularly a brushless electric motor, a fan impeller, rotationally driven by the electric motor, and a motor support as described hereinabove in all its combinations, the motor, particularly the stator of the motor, being fixed to the inner ring of the motor support.

Yet another aspect of the invention describes a heating, ventilation and/or air conditioning device for a motor vehicle, comprising a fan as described hereinabove in all its combinations.

BRIEF DESCRIPTION OF THE DRAWINGS

Further features, details and advantages will become more clearly apparent from reading the description given below by way of illustration and with reference to the following figures.

DETAILED DESCRIPTION

Figure 1:
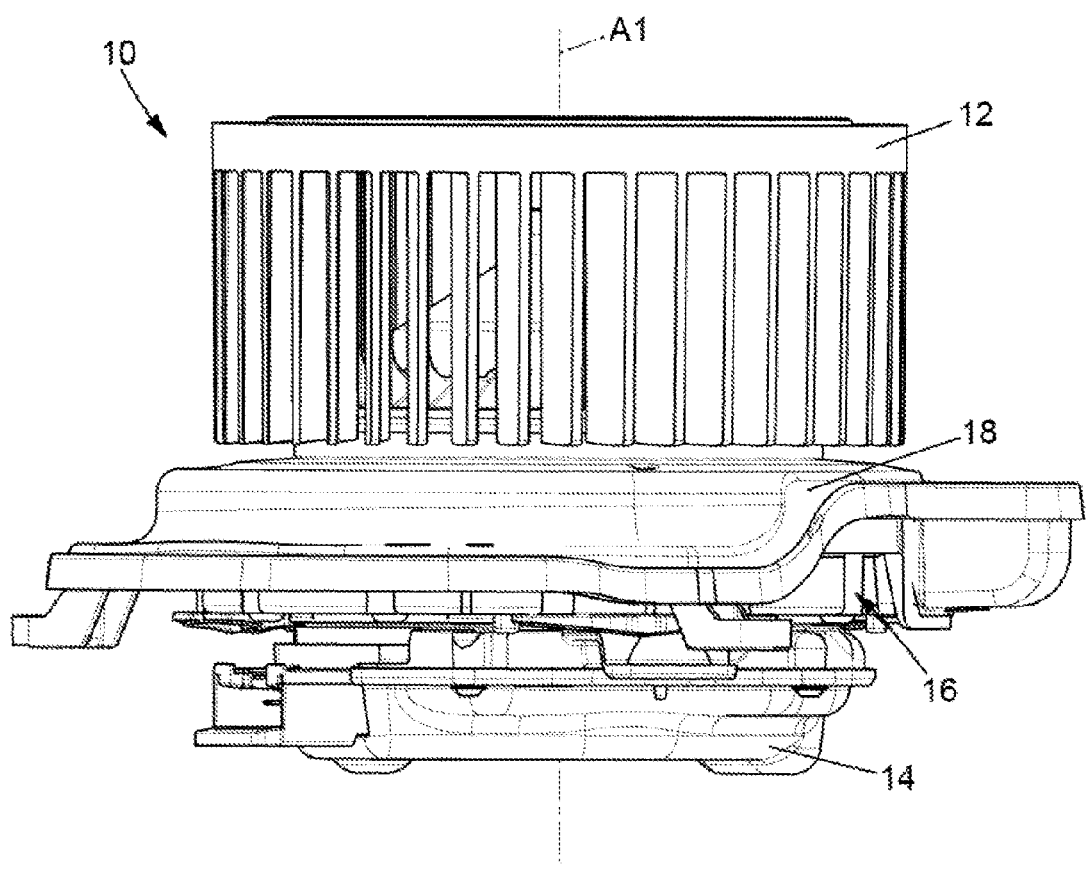
FIG. 1 is a schematic side view of one example of a fan device for a heating, ventilation and/or air conditioning device for a motor vehicle.

FIG. 1 schematically illustrates a side view of a fan device 10 for a heating, ventilation and/or air conditioning device for a motor vehicle. In the conventional way, such a heating, ventilation and/or air conditioning device for a motor vehicle comprises a ventilation circuit, a fan device 10 for causing the air to move in the ventilation circuit, and means for heating and/or means for cooling the flow of air set in motion by the fan device 10.

As illustrated in FIG. 1, the fan device 10 essentially comprises a fan impeller 12 and an electric motor, here hidden by a motor cowl 14, for driving the rotation of the fan impeller 12 about its axis A1. The electric motor is, for example, a brushless motor. The fan device 10 further comprises a motor support 16 allowing the electric motor to be assembled on a support. In this particular instance, the electric motor is connected to a deflector 18 of the motor support 16, the deflector 18 forming part of the ventilation circuit of the heating, ventilation and/or air conditioning device.

The motor support 16 is described in greater detail in what follows.

As visible in the figures, the motor support 16 essentially comprises an inner ring 20, an outer ring 22 and a decoupling element 24 interposed between the inner ring 20 and the outer ring 22. The decoupling element 24 is aimed at limiting the transmission of vibrations from one of the two rings 20, 22 to the other of the two rings 20, 22. The decoupling element 24 is formed here by an elastomer ring. By way of example, the elastomer material is SEBS (polystyrene-b-poly(ethylene-butylene)-b-polystyrene). The decoupling ring 24 is, for example, overmolded on the inner ring 20 and outer ring 22. The decoupling ring 24 thus secures together the inner ring 20 and outer ring 22. The inner ring 20, outer ring 22 and decoupling ring 24 are coaxial, having, as common axis, the axis of rotation A of the fan impeller 12.

The assembly formed by the inner ring 20, outer ring 22 and decoupling ring 24 is housed in a cavity of the deflector 18. The inner ring 20 is secured to the stator (not visible here) of the motor. The outer ring 22 is fixed here to the deflector 18. A layer of elastomer material may be interposed between the outer ring 22 and the deflector 18.

According to the example depicted in the figures, the inner ring 20 has a plurality of fingers 26. The fingers 26 extend radially outward, from the exterior surface of the inner ring 20. In this particular instance, each finger 26 has an H-shaped cross section, comprising two substantially planar surfaces $26_1$, $26_2$ connected to one another by a web $26_3$. Here, the planar surfaces $26_1$, $26_2$ are normal to the direction of the axis A1 common to the rings 20, 22, 24. Here, each planar surface $26_1$, $26_2$ is covered with a layer $27_1$, $27_2$ of elastomer material.

In the example illustrated, the inner ring 20 has three fingers 26. The fingers 26 are preferably uniformly angularly distributed about the axis A1 of the inner ring 20.

The outer ring 22 for its part comprises a plurality of receptacles 28. Each receptacle 28 is designed to accept a respective finger 26. The receptacles 28 thus open at least onto the radially internal surface of the outer ring 22. In this particular instance, the receptacles 28 pass all the way through, opening onto the radially internal surface of the outer ring 22 and onto the radially external surface of the outer ring 22. The receptacles 28 are preferably uniformly angularly distributed about the axis A1 of the outer ring 22.

The housing of the fingers 26 in the receptacles 28 makes it possible to limit the capacity for relative tilting of the inner ring 20 with respect to the outer ring 22. What is meant here by tilting is any movement of one of the rings 20, 22 with respect to the other 20, 22 outside of the common midplane of the rings 20, 22, normal to the direction of the axis A1 common to the two rings 20, 22.

In the example illustrated, the receptacles 28 have dimensions such that there is clearance between the walls of each receptacle 28 and the finger 26 housed therein. In particular, there is clearance in the orthoradial direction. The walls of each receptacle 28 are covered here with elastomeric material. As a preference, the layer of elastomer 30 that covers the walls of each receptacle 28 is formed as one with the decoupling ring 24.

Figure 4:
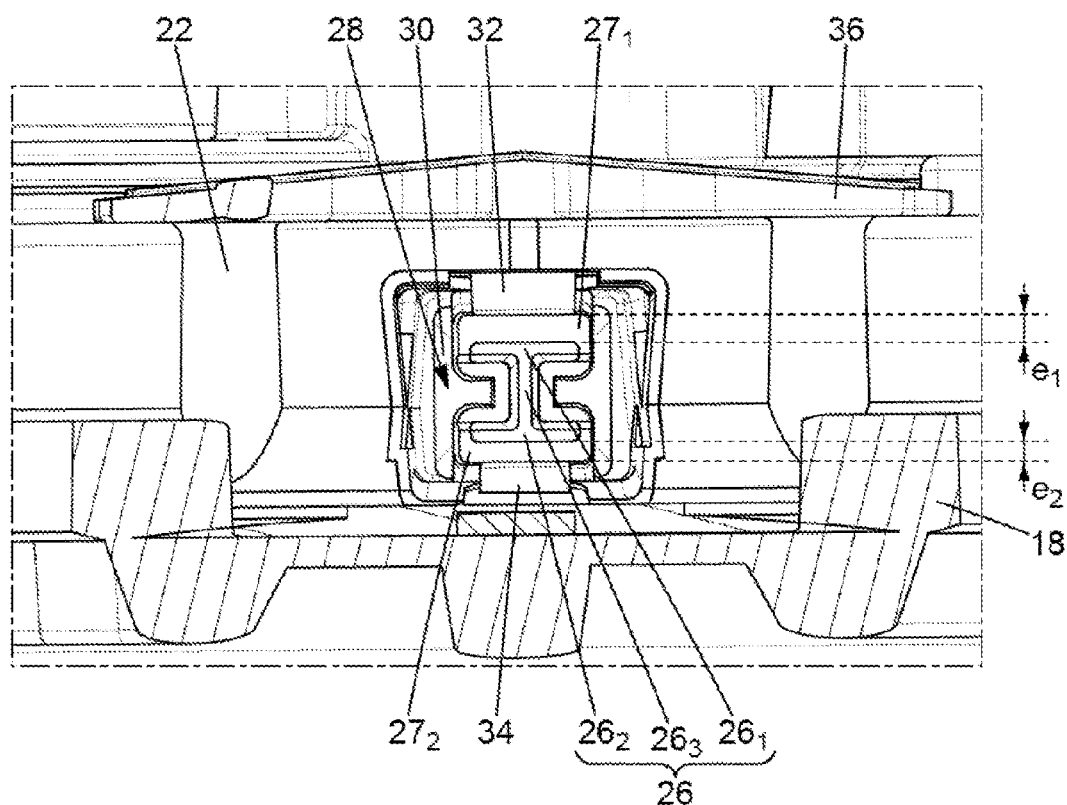
FIG. 4 is a schematic side view of a detail of the sub-assembly of FIG. 3.
Figure 5:
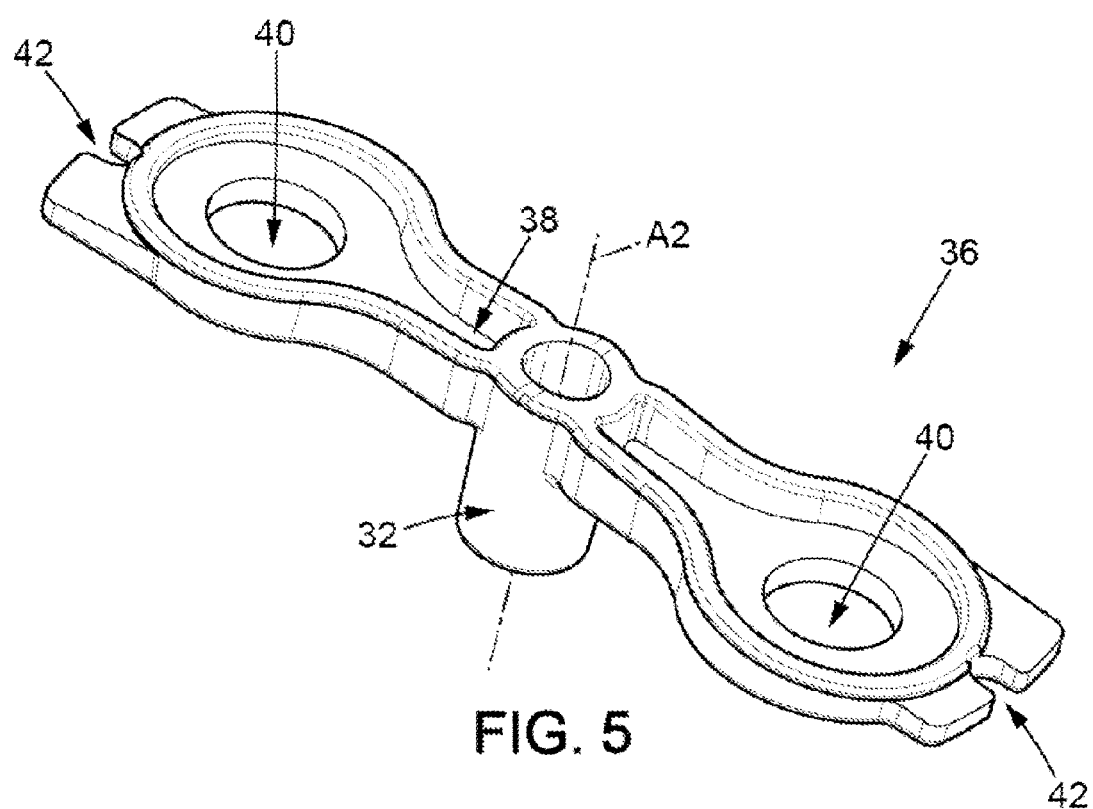
FIG. 5 is a schematic perspective view of a peg used in the motor support of FIGS. 2 and 3.

As is more particularly visible in FIG. 4, in each receptacle 28, the finger 26 collaborates with two axial end-stops 32, 34 to further limit the axial movement of the finger 26 in the receptacle 28. Here, the two axial end-stops 32, 34 project from the walls of the receptacle 28. What is meant here by an axial end-stop is a stop that limits movement in the direction of the common axis A1 of the rings 20, 22, 24.

In the example illustrated, the elastomeric material of one of the layers $27_1$, $27_2$ is in contact between one of the axial end-stops 32, 34 and one of the planar surfaces $26_1$, $26_2$ of the finger 26. This then limits the possible travel of the finger 26 in the receptacle 28 in the axial direction A1. In order to limit this axial travel still further, the elastomeric material of the layers $27_1$, $27_2$ present between the axial end-stops 32, 34 and the planar surfaces $26_1$, $26_2$ is compressed here. For example, the elastomeric material of the layers $27_1$, $27_2$ present between the axial end-stops 32, 34 and the planar surfaces $26_1$, $26_2$ has an axial compression ratio greater than or equal to 5% and/or less than or equal to 25%, preferably substantially equal to 15%. The axial compression ratio $\varepsilon_1$, $\varepsilon_2$ is defined as being the ratio between:

the difference between, on the one hand, the thickness $e_1^0$, $e_2^0$ of the layer of elastomer on the planar surfaces $26_1$, $26_2$ of the fingers 26 before the fingers 26 are placed between the axial end-stops 32, 34, and, on the other hand, the thickness $e_1$, $e_2$ of the layer of elastomer $27_1$, $27_2$ on the planar surfaces $26_1$, $26_2$ of the fingers 26 after the fingers 26 have been placed between the axial end-stops 32, 34; and the thickness $e_1^0$, $e_2^0$ of the layer of elastomer on the planar surfaces $26_1$, $26_2$ of the fingers 26 before the fingers 26 are placed between the axial end-stops 32, 34:

$$\varepsilon_1 = \frac{e_1^0 - e_1}{e_1^0}, \quad \varepsilon_2 = \frac{e_2^0 - e_2}{e_2^0} \quad \text{[Math. 1]}$$

Thus, the possible deformation of the elastomer material makes it possible to limit the transmission of vibrations from one of the two rings 20, 22 to the other of the two rings 20, 22. At the same time, the compression of the elastomer material of the layers $27_1$, $27_2$ does, however, limit the movement of the fingers 26 and, as a result, the capacity for relative movement of the two rings 20, 22.

Also in order to achieve this, the elastomeric material of which the layers $27_1$, $27_2$ are formed may be chosen according to its hardness. This elastomeric material may notably have a hardness greater than or equal to 25 Shore and/or less than or equal to 60 Shore.

The thicknesses $e_1$, $e_2$, on the one hand, and/or $e_1^0$, $e_2^0$, on the other hand, are advantageously substantially equal. This then allows a centering of the fingers 26 between the two axial end-stops 32, 34.

The elastomeric material of the layers $27_1$, $27_2$ may advantageously be overmolded on the surfaces $26_1$, $26_2$ of the fingers 26, particularly at the same time as the overmolding of the decoupling ring 24. The elastomeric material is thus held in position with respect to the fingers 26. This then also makes the inner ring 20 easier to mount with respect to the outer ring 22.

The first axial end-stop is formed here by a spigot 32 of a peg 36. The peg 36 also comprises a substantially planar base 38 from which the spigot 32 extends along an axis A2 intended to be parallel to the common axis A1 of the rings 20, 22, 24 when the peg 36 is fixed on the outer ring 22. To provide this fixing, the base 38 here has two openings 40 which are intended to be mounted tightly on two complementary cylindrical reliefs formed on the outer ring 22. Furthermore, two notches 42 are provided at the longitudinal ends of the base 38. One of the two notches 42 accepts a complementary rib formed by the outer ring 22, to guide the mounting of the peg 36 on the outer ring 22. The spigot 32 is mounted tightly in a hole in the outer ring 22 so as to project into a receptacle 28 and thus form the first axial end-stop 32. More specifically, the spigot 32 extends in the direction of the common axis A1 of the rings 20, 22, 24, from one of the walls of the receptacle 28, toward the finger 26 housed therein.

The second axial end-stop 34 is here formed by the deflector 18 which comprises projecting cylindrical reliefs passing through an opening in the outer ring 22 so as to project into the receptacles 28 from an opposite wall to the first axial end-stop 32. The projecting cylinders also extend in a direction parallel to the direction of the axis A1 common to the rings 20, 22, 24.

Figure 2:
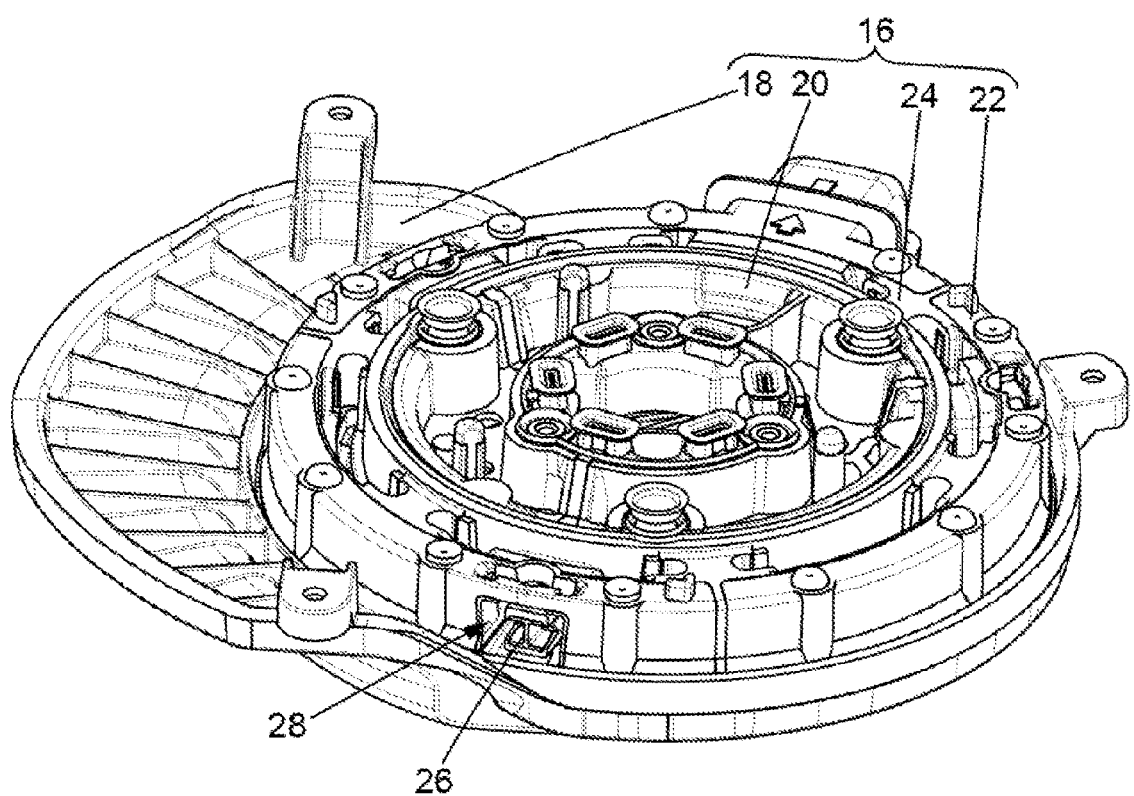
FIG. 2 is a schematic perspective view of an assembly formed by the motor support and a housing of the fan device of FIG. 1.
Figure 3:
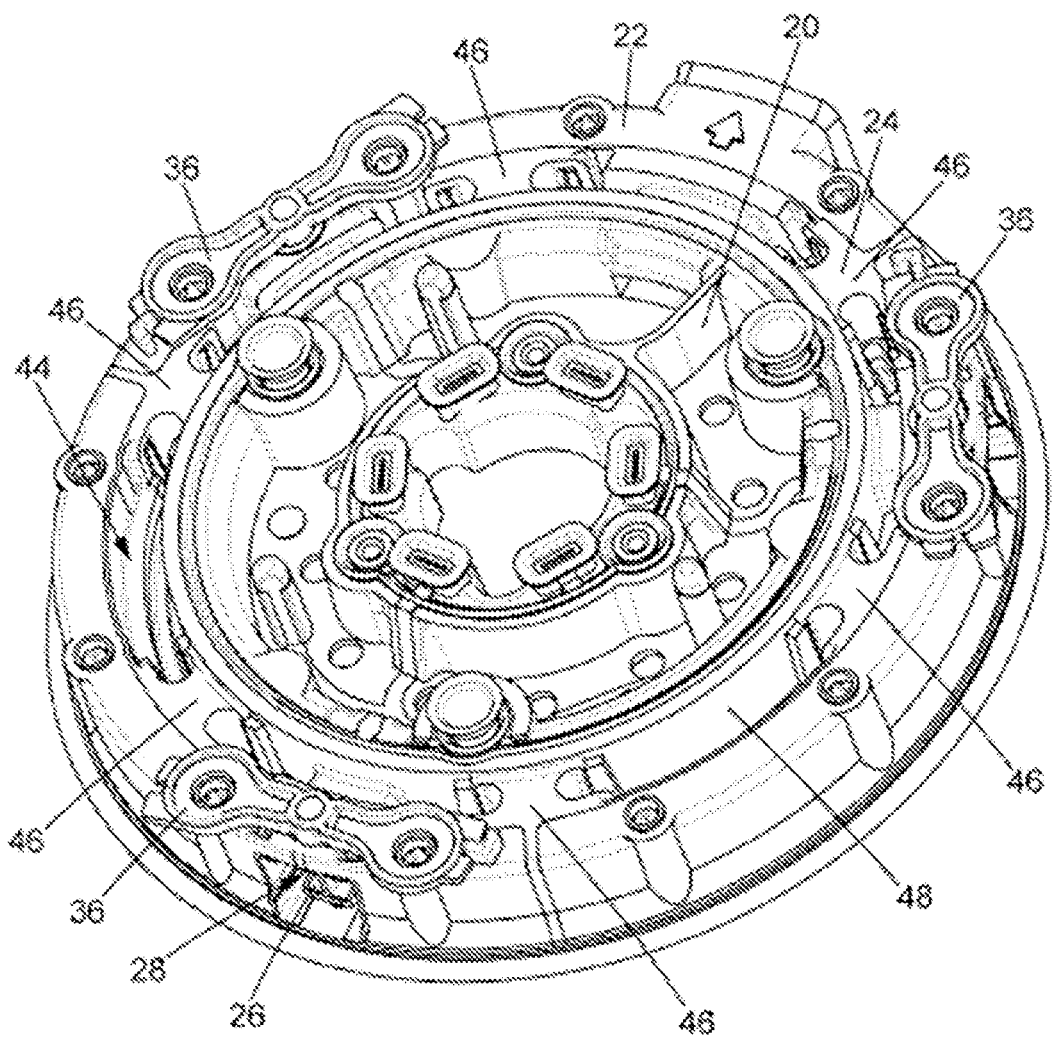
FIG. 3 is a schematic perspective view of a sub-assembly of the motor support of FIG. 2.

Moreover, as is particularly visible in FIGS. 2 and 3, the decoupling ring 24 defines an annular trench 44 between the inner ring 20 and outer ring 22. In this trench 44, the decoupling ring 24 forms blocks 46. The blocks 46 are thus formed as one with the decoupling ring 24. In this instance, the decoupling ring 24 forms six blocks 46. The six blocks 46 here form three pairs of blocks 46 which are substantially uniformly angularly distributed about the axis A1. Each pair of blocks 46 comprises, for example, a block 46 on each side of a finger 26.

The blocks 46 are essentially aimed at reinforcing the decoupling ring 24, notably in the direction of the common axis A1 of the rings 20, 22, so as to reduce the risk of cracks appearing in the decoupling ring 24. However, the corresponding addition of material, which accentuates the stiffness of the decoupling ring 24, has an accompanying tendency to increase the resonant frequency of the motor support 16, notably of the decoupling ring 24. This increase in the resonant frequency results in a potential increase in the noise in the interior of the vehicle equipped with the motor support 16.

Figure 6:
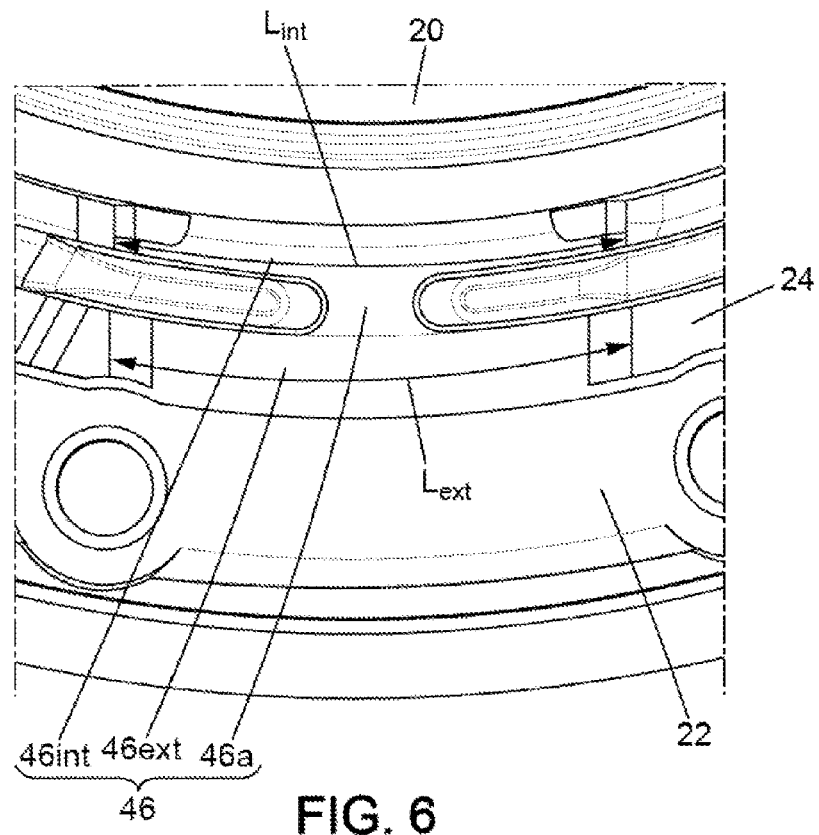
FIG. 6 depicts a detail of the sub-assembly of FIG. 3.

As a result, the shape of the blocks 46 is chosen so as to allow the stiffness of the decoupling ring 24 to be actually increased in the direction of the common axis A1 of the rings 22, 24, while at the same time limiting the increase in the resonant frequency of the motor support 16. In order to do this, the blocks 46 are substantially H-shaped. Strictly speaking, as illustrated in FIG. 6 for example, the two arms 46*int*, 46*ext* are slightly curved, the length Lint of the interior arm 46*int* being slightly shorter than the length Lext of the exterior arm 46*ext*. However, in practice, and as has been illustrated in FIG. 7, the block 46 may be considered as being H-shaped with two rectilinear arms 46$_1$, 46$_2$ of length L equal to the mean of the lengths Lint, Lext of the interior arm 46*int* and exterior arm 46*ext*.

The two arms 46*int*, 46*ext*, respectively 46$_1$, 46$_2$, of the H are separated by a distance B, oriented in the radial direction of the rings 20, 22, 24. Each arm 46*int*, 46*ext*, respectively 46$_1$, 46$_2$, of the H has a width D measured in the radial direction. The web 46*a* of the H has a width A, measured in the orthoradial direction. The width A of the web 46*a* and the distance B between the two arms 46*int*, 46*ext*, respectively 46$_1$, 46$_2$, of the H are such that the ratio A/B is greater than or equal to 1.4. Furthermore, the ratio A/D is greater than or equal to 2. Specifically, the inventors have found that, surprisingly, by conforming to these inequalities, it is possible to strengthen the decoupling ring 24 while at the same time maintaining a relatively low resonant frequency, notably below 75 Hz, preferably below 50 Hz.

The width A of the web of the H 46 may be greater than or equal to 4 mm and/or less than or equal to 20 mm.

The distance B between the arms 46*int*, 46*ext*, respectively 46$_1$, 46$_2$, of the H 46 may be greater than or equal to 3 mm and/or less than or equal to 6 mm.

The width D of the arms 46*int*, 46*ext*, respectively 46$_1$, 46$_2$, of the H 46 may be greater than or equal to 2 mm and/or less than or equal to 5 mm.

In order to further improve the mechanical strength of the assembly, the blocks 46 are advantageously flush with the inner ring 20 and/or with the outer ring 22, in the direction of the common axis A1 of the two rings. To achieve this, the thickness C of the blocks, measured in the direction of the common axis A1 of the rings 20, 22, 24, is preferably greater than or equal to 10 mm, preferably greater than or equal to 14 mm, and/or less than or equal to 20 mm, preferably less than or equal to 16 mm.

The blocks 46 may still be made of a polymer material, for example SEBS. The polymer material from which the blocks 46 are formed may have a hardness of between 25 and 60 Shore, notably substantially equal to 40 Shore. The use of a substantially softer material makes it possible to limit the resonant frequency of the motor support 16 still further.

The decoupling ring 24 also forms an annulus 48, here arranged radially between the inner ring 20 and the blocks 46. The annulus 48 for example covers substantially the entire radially external surface of the inner ring 20.

Variants of the shape of the blocks 46 are described in further detail in what follows, with reference to FIGS. 6 to 13.

Figure 7:
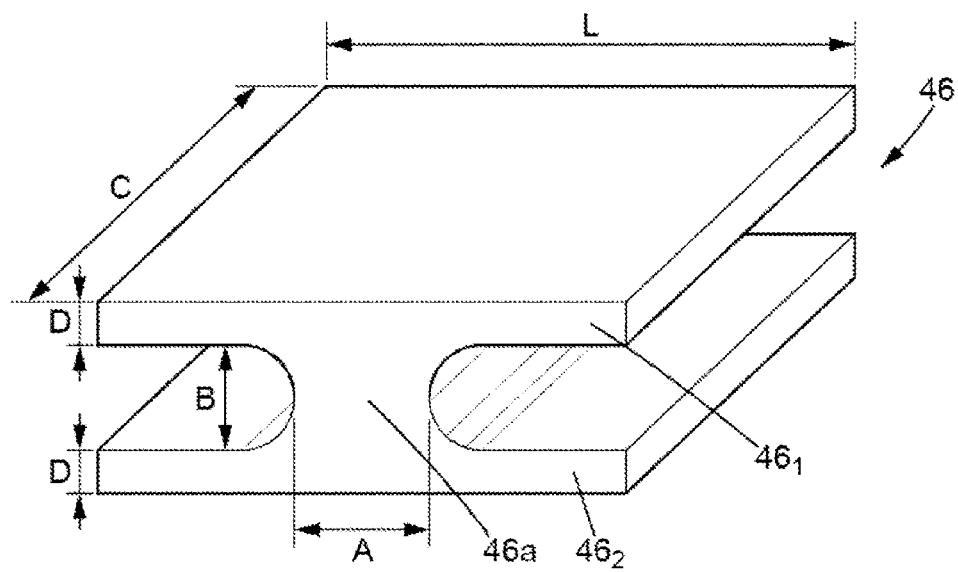
FIG. 7 schematically depicts the detail of FIG. 6.

In the example of FIGS. 6 and 7:
the thickness C of the block 46 is, for example, comprised between 10 and 20 mm, notably substantially equal to 14 mm;
the width A of the web is, for example, comprised between 3 and 6 mm, notably substantially equal to 4.4 mm;
the distance B between the arms 46*int*, 46*ext*, respectively 46$_1$, 46$_2$, of the H is, for example, comprised between 3 mm and 6 mm, notably substantially equal to 3 mm.

With blocks such as this it has been possible to create a decoupling ring 24 of which the natural frequency was substantially equal to 32 Hz.

Figure 8:
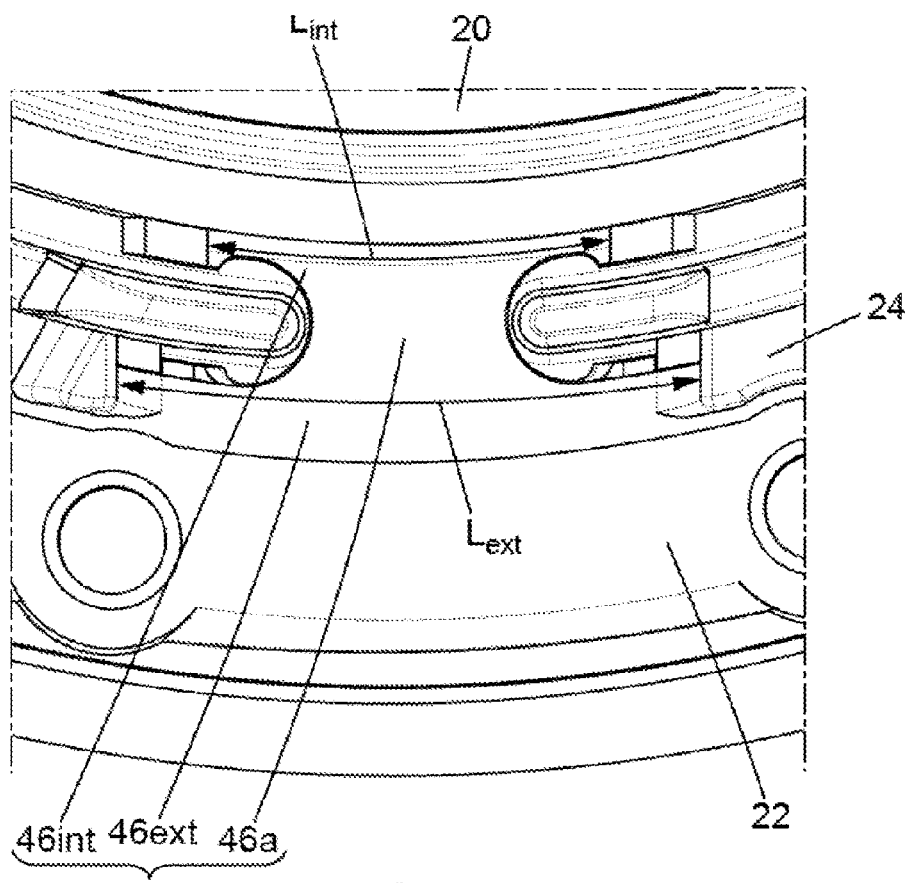
FIG. 8 depicts a detail of a first variant of the sub-assembly of FIG. 3.
Figure 9:
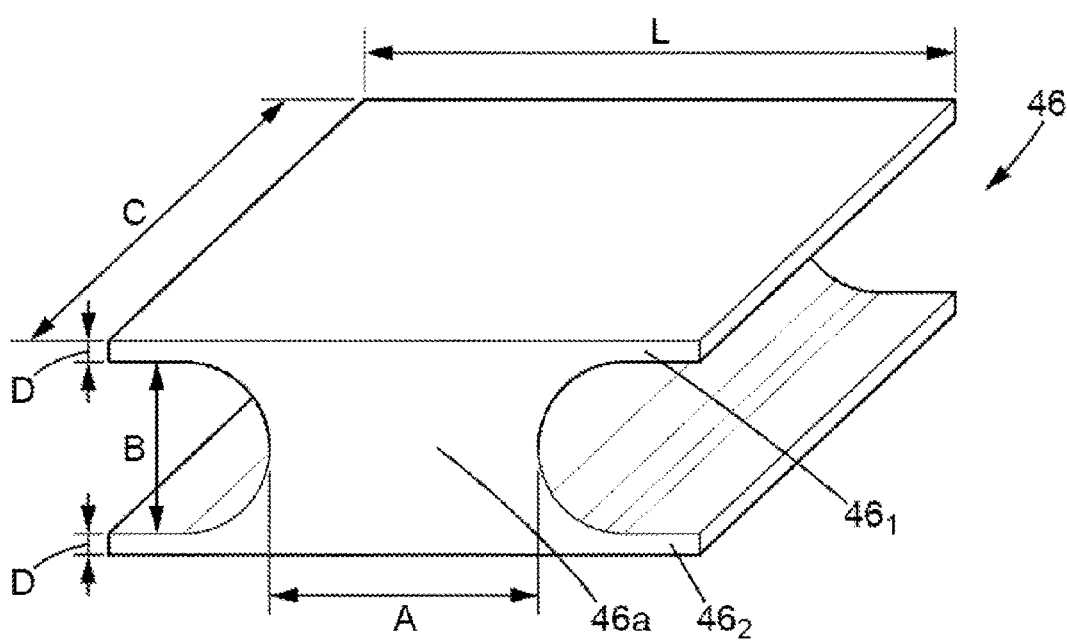
FIG. 9 schematically depicts the detail of FIG. 8.

In the example of FIGS. 8 and 9:
the thickness C of the block 46 is, for example, comprised between 10 and 20 mm, notably substantially equal to 16 mm;
the width A of the web is, for example, comprised between 6 and 10 mm, notably substantially equal to 8.8 mm;
the distance B between the arms 46*int*, 46*ext*, respectively 46$_1$, 46$_2$, of the H is, for example, comprised between 3 mm and 6 mm, notably substantially equal to 6 mm.

With such a geometry for the blocks 46 it has been possible to create a decoupling ring 24 of which the natural frequency was substantially equal to 32 Hz when a material with a hardness substantially equal to 25 Shore was employed. With the same geometry and a material of a hardness substantially equal to 40 Shore, the natural frequency is substantially equal to 47 Hz.

Figure 10:
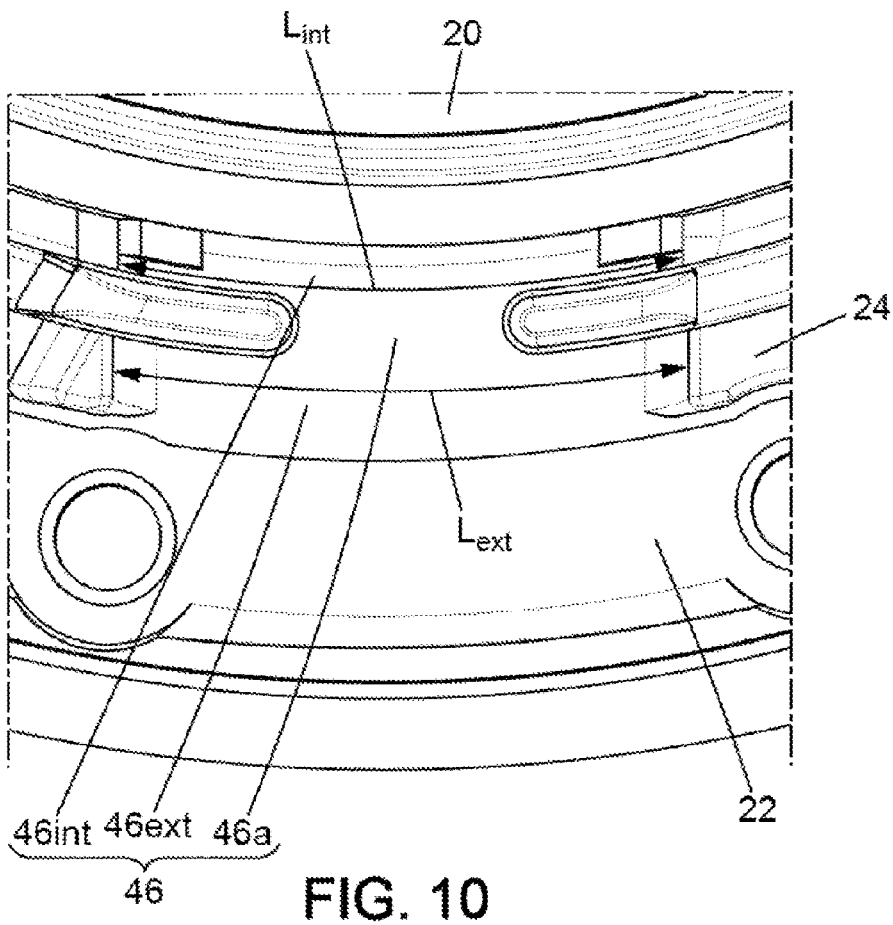
FIG. 10 depicts a detail of a second variant of the sub-assembly of FIG. 3.
Figure 11:
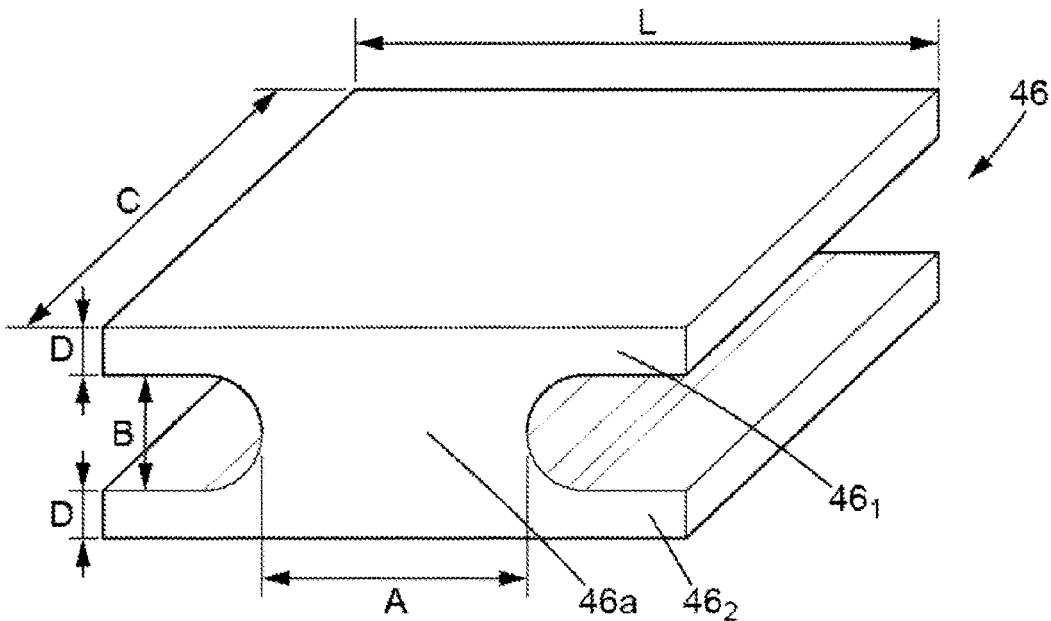
FIG. 11 schematically depicts the detail of FIG. 10.

In the example of FIGS. 10 and 11:
the thickness C of the block 46 is, for example, comprised between 10 and 20 mm, notably substantially equal to 16 mm;
the width A of the web is, for example, comprised between 6 and 10 mm, notably substantially equal to 8.8 mm;
the distance B between the arms 46*int*, 46*ext*, respectively 46$_1$, 46$_2$, of the H is, for example, comprised between 3 mm and 6 mm, notably substantially equal to 3 mm.

With such a geometry for the blocks 46 it has been possible to create a decoupling ring 24 of which the natural frequency was substantially equal to 45 Hz when a material with a hardness substantially equal to 25 Shore was employed. With the same geometry and a material of a hardness substantially equal to 40 Shore, the natural frequency is substantially equal to 67 Hz.

Figure 12:
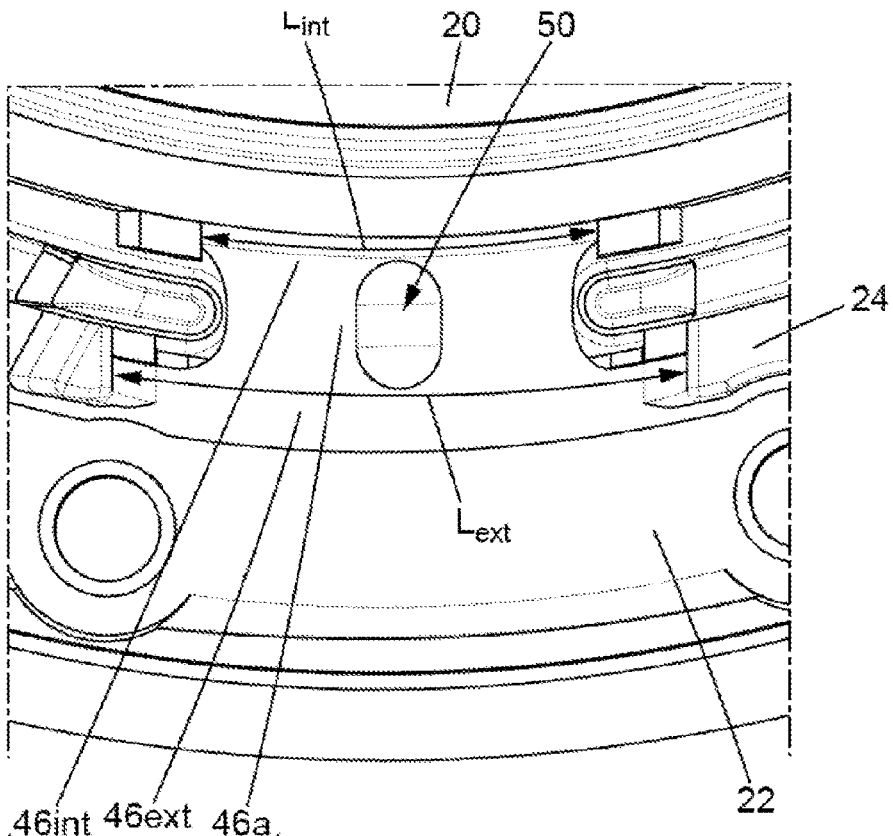
FIG. 12 depicts a detail of a third variant of the sub-assembly of FIG. 3.
Figure 13:
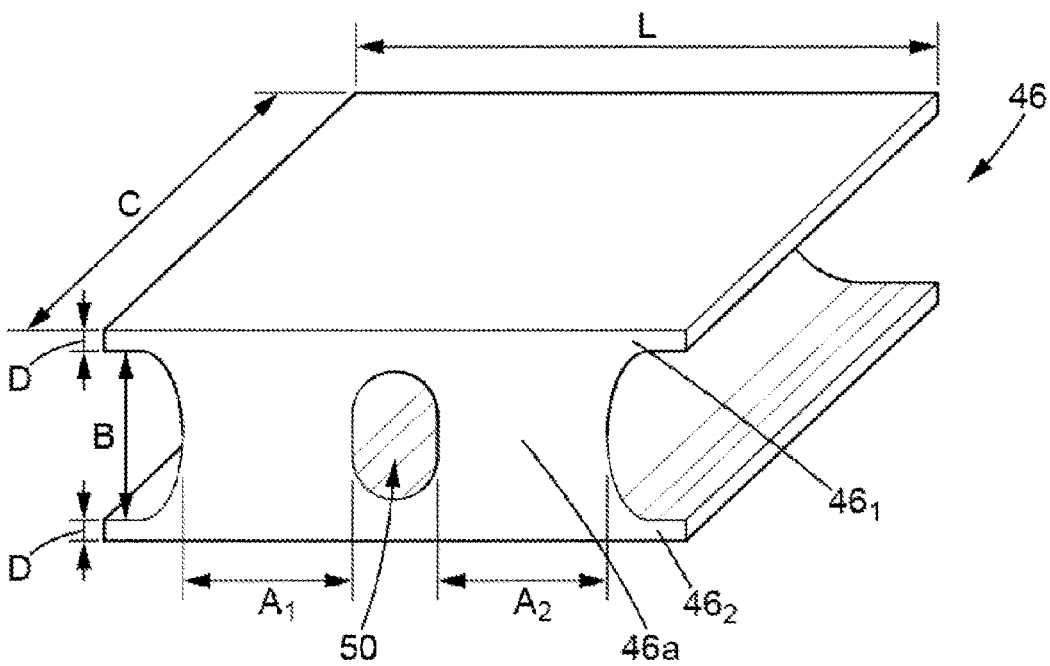
FIG. 13 schematically depicts the detail of FIG. 12.

Finally, in the example of FIGS. 12 and 13:
the thickness C of the block 46 is, for example, comprised between 10 and 20 mm, notably substantially equal to 16 mm;
the width A of the web is, for example, comprised between 10 and 20 mm, notably substantially equal to 12 mm;
the distance B between the arms 46*int*, 46*ext*, respectively 46$_1$, 46$_2$, of the H is, for example, comprised between 3 mm and 6 mm, notably substantially equal to 6 mm.

It should be noted that the width A of the web 46*a* here corresponds to the sum of the two lengths A$_1$, A$_2$ measured orthoradially along a median arc of the web 46*a*, on either side of a hole 50. Here, the two lengths A$_1$, A$_2$ are substantially equal such that the hole 50 is substantially in the middle of the median arc of the web 46*a*. The hole 50 is advantageously a blind hole, so that it does not impair the fluidtightness of the motor support 16. The hole 50 notably makes the decoupling ring 24 and, in particular, blocks 46 of relatively large dimensions, easier to mold. It should be noted here that the web 46*a* may have more than one hole 50, preferably blind. The length A of the web 46*a* then corresponds to the sum of the lengths measured on either side of the various holes 50, along a median arc of the web 46*a*.

With such a geometry for the blocks 46 it has been possible to create a decoupling ring 24 of which the natural frequency was substantially equal to 35 Hz when a material with a hardness substantially equal to 25 Shore was employed. With the same geometry and a material of a hardness substantially equal to 40 Shore, the natural frequency is substantially equal to 53 Hz.

The present disclosure is not restricted to the example described hereinabove but encompasses all variants and combinations conceivable to a person skilled in the art within the scope of the protection sought.

According to a first embodiment variant, one single axial end-stop projects into the receptacles 28. In that case, the finger housed in the receptacle may be clamped between, on the one hand, the projecting axial end-stop and, on the other hand, the opposite wall of the receptacle from the projecting axial end-stop.

Furthermore, the axial end-stops may be produced using means other than those described in the above example. For example, one and/or the other of the axial end-stops may be produced in the form of a boss on the wall of the receptacle, and extending toward the finger housed in the receptacle.

Likewise, in the example illustrated, the elastomeric material is present on the faces of the fingers facing the axial end-stops. Alternatively or in addition, elastomeric material may be provided on the axial end-stops, whether or not these project. However, as a preference, contact between two layers of elastomer material is avoided. Thus, as a preference, just one of the two contacting surfaces is covered with elastomeric material.

Furthermore, in the example illustrated, the inner ring forms fingers housed in receptacles formed in the outer ring. However, the reverse configuration is conceivable, with the outer ring having fingers oriented radially toward the inner ring and housed in receptacles formed in this inner ring.

It should also be noted that the decoupling element may adopt a form other than that of a decoupling ring.

The blocks may be distinct from the decoupling ring, the decoupling ring and the blocks then forming a decoupling means.

The invention claimed is:

1. A motor support for a motor-fan unit of a vehicle ventilation installation, comprising: two coaxial rings including an inner ring able to accept one or more elements of the motor and an outer ring able to be fixed to a housing that forms a structural element; and a decoupling means for decoupling the two coaxial rings a plurality of blocks which are made of an elastomeric material and are interposed between the inner ring and the outer ring, each block being substantially H-shaped, the two arms of the H being separated by a distance B, each arm having a width D measured in the radial direction, the web of the H having a width A, measured in the orthoradial direction, wherein the ratio A/B is greater than or equal to 1.4 and the ratio A/D is greater than or equal to 2, and wherein each block has a thickness C measured in the direction of a common axis of the two rings, the thickness C being greater than or equal to 14 mm, and less than or equal to 16 mm, and/or the distance B is greater than or equal to 3 mm and less than or equal to 6 mm.

2. The motor support as claimed in claim 1, wherein each block has a thickness C measured in the direction of a common axis of the two rings, the thickness C being greater than or equal to 14 mm, and less than or equal to 16 mm, and/or the distance B is greater than or equal to 3 mm and less than or equal to 6 mm.

3. The motor support as claimed in claim 1, wherein the width D of the arms of the H is greater than or equal to 2 mm and/or less than or equal to 5 mm.

4. The motor support as claimed in claim 1, wherein the web of the H has a blind hole substantially at the center of the web and extending in the direction of the common axis of the two rings.

5. The motor support as claimed in claim 1, wherein each block is flush with at least one of the two rings in the direction of the common axis of the two rings.

6. The motor support as claimed in claim 1, wherein the elastomer material has a hardness of between 25 and 60 Shore.

7. A fan for a ventilation installation for a vehicle, comprising:
 a brushless electric motor;
 a fan impeller, rotationally driven by the electric motor; and
 a motor support as claimed in claim 1, wherein a stator of the motor-is fixed to the inner ring of the motor support.

8. The motor support as claimed in claim 1, wherein the decoupling means comprises an elastomer ring extending between the two rings, the elastomer ring being formed as one with the blocks.

9. The motor support as claimed in claim 8, wherein the elastomer ring defines an annulus positioned radially between one of either the inner ring or the outer ring and the blocks.

\* \* \* \* \*